United States Patent [19]

Bellehache et al.

[11] 4,072,162

[45] Feb. 7, 1978

[54] VALVE STRUCTURE FOR A SPRAYING CONTAINER

[75] Inventors: Pierre Bellehache, Sainte-Adresse; Yves Le Troadec, Rouen, both of France

[73] Assignee: Pont-A-Mousson S.A., Nancy, France

[21] Appl. No.: 659,877

[22] Filed: Feb. 20, 1976

[30] Foreign Application Priority Data

Mar. 13, 1975 France .................................. 75 07913

[51] Int. Cl.$^2$ ..................... B65B 3/04; B65B 31/00; F16K 13/04

[52] U.S. Cl. ........................................ 137/71; 53/29; 137/316; 141/20

[58] Field of Search ................ 137/68 R, 69, 71, 316; 141/20, 3; 222/402.16

[56] References Cited

U.S. PATENT DOCUMENTS

| | | | |
|---|---|---|---|
| 733,372 | 7/1903 | Colwell | 137/71 |
| 2,974,453 | 3/1961 | Meshberg | 222/402.16 X |
| 3,605,791 | 9/1971 | Troadec | 137/316 |
| 3,995,694 | 12/1976 | Freiburger | 137/71 X |

*Primary Examiner*—Martin P. Schwadron
*Assistant Examiner*—Richard Gerard
*Attorney, Agent, or Firm*—Sughrue, Rothwell, Mion, Zinn and Macpeak

[57] ABSTRACT

In a spraying container structure, before the sealing and blowing operations there is mounted in the valve body comprising a housing and a cover which is provided with a temporary sleeve, a closure member which is adapted to cooperate with a sealing element to close the valve. The closure member is maintained in the valve open position in the valve body during the production of the container.

5 Claims, 6 Drawing Figures

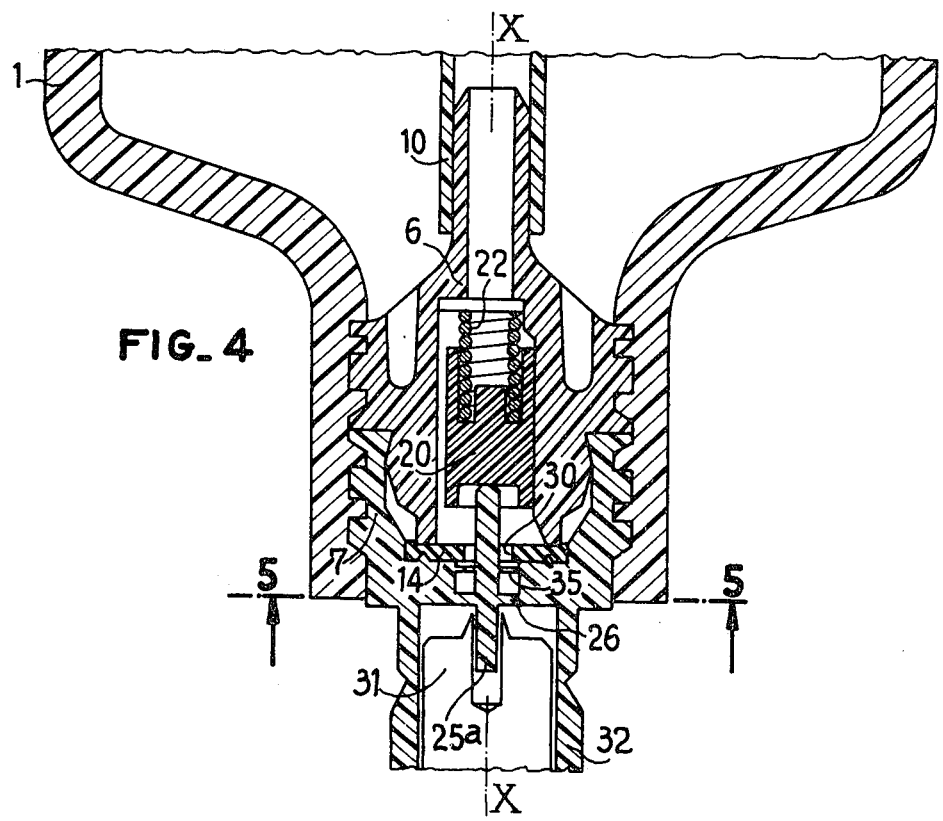
FIG_4
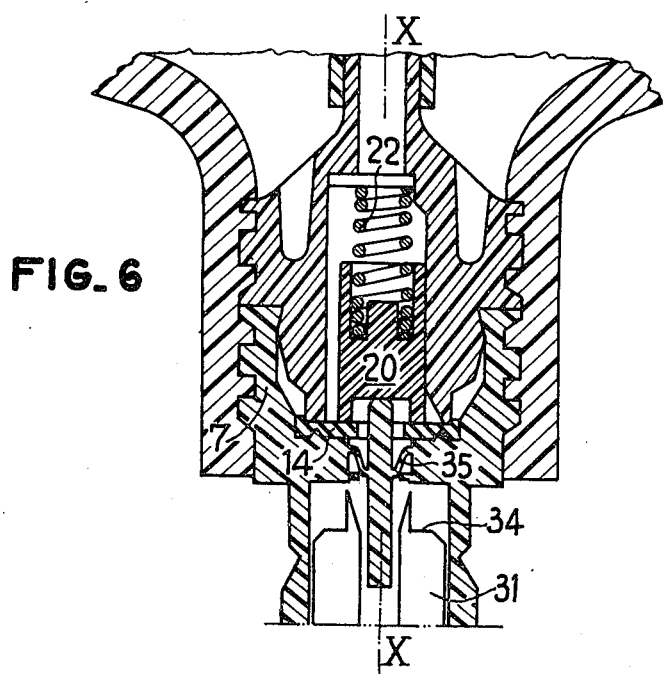
FIG_6

VALVE STRUCTURE FOR A SPRAYING CONTAINER

The present invention relates to an aerosol bottle, and more particularly applies to a valve structure for such containers.

In the course of this operation, plastics material is presented in the form of a blank which is usually engaged around the body of a valve and clamped against the latter, the interengagement being ensured by projections provided on the outer lateral surface of the body of the valve. When the blank is thus rendered integral with the body of the valve, the subsequent operations comprise introducing inside the blank various fluids, such as air for blowing and forming the body of the container, inert gas for cooling and scavenging, a filling product and a propelling product. Consequently, the valve must be in its open position for all these operations.

In the prior art, the different aforementioned fluids are supplied via a sleeve which is rendered temporarily integral with the body of the valve and enter the container in passing through the valve which is devoid of its closure member or piston. This closure member or piston is in a waiting position inside the temporary sleeve and is introduced into the body of the valve only at the end of the filling operations, the closure member or piston being for this purpose pushed through the sealing element provided inside the body of the valve. There is shown in the valve body, which comprises a housing and a cover provided with a temporary sleeve, a closure member adapted to cooperate with a sealing element to ensure the closure of the valve, and the closure member is maintained in the valve-opening position in the valve body during the manufacture of the container.

In filling the spraying container, after the container-filling operations, the valve is closed by the release of the closure member and the application of the latter against the sealing element.

An object of the invention is to provide a valve comprising a body including a housing and a cover which is provided with a temporary sleeve and is mounted on the housing, the housing and the cover defining a chamber and each having an axial aperture opening into said chamber, a closure member movably mounted in said chamber in opposition to the action of elastically yieldable means for applying the closure member against a sealing element mounted in said cover, wherein the closure member is maintained spaced away from the sealing element by abutment means rendered integral with the body of the valve by destructible fixing means.

Further features and advantages of the invention will be apparent from the ensuing description with reference to the accompanying drawings in which:

FIG. 3 is a partial sectional view, similar to FIG. 1, of the valve in its closed position;

FIG. 4 is a view similar to FIG. 1 of a modification of the invention;

FIG. 6 is a partial sectional view, similar to FIG. 4, of the valve in its closed position.

Figure 1:
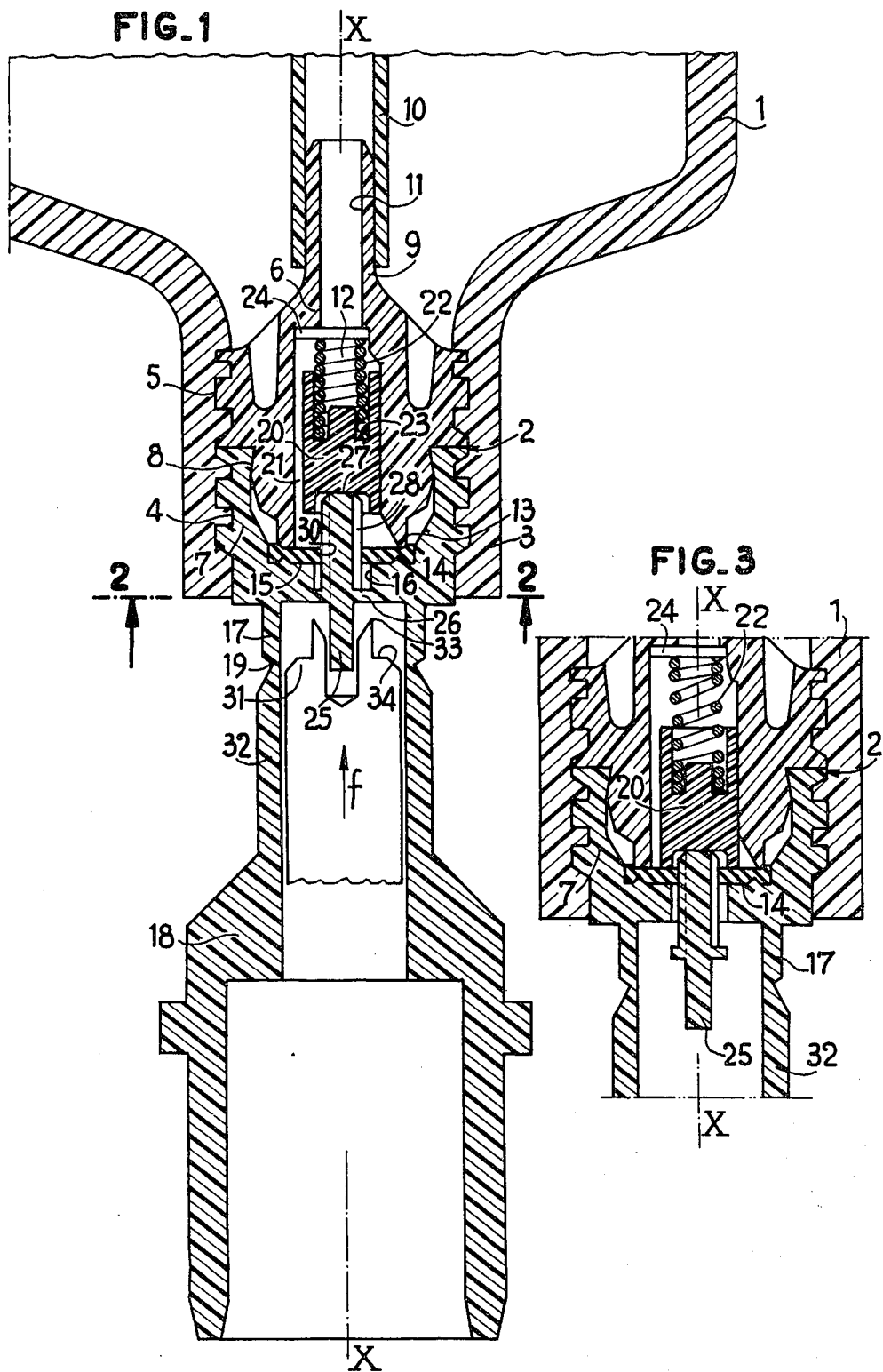
FIG. 1 is a partial axial sectional view of an assembly permitting the application of the invention, with the valve in its open position.
Figure 2:
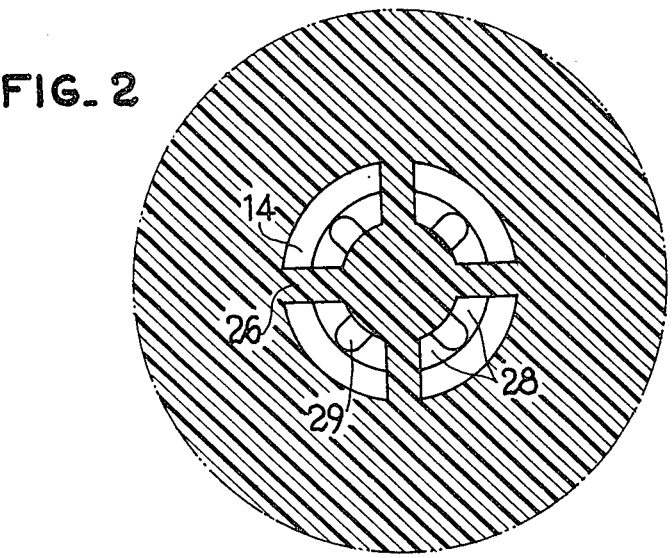
FIG. 2 is a sectional view taken on line 2—2 of FIG. 1.

In the embodiment shown in FIGS. 1-3, the invention is applied to a container of the aerosol bottle type comprising a body 1 obtained by the extrusion and blowing of a blank of plastics material and a valve body generally designated by the reference numeral 2. The neck 3 of the container is sealed around the valve body 2, the interengagement of the two elements being achieved by the effect of grooves 4 and projections 5 provided on the outer lateral surface of the valve body 2.

The valve body 2 comprises two parts, namely a housing 6 and a cover 7 which are assembled by clipping the cover 7 on an annular ramp or ledge 8 of the housing 6. The end of the housing 6 facing the interior of the container is provided with an end portion 9 on which a plunger tube 10 is fitted.

The end portion 9 is provided with a bore 11 having an axis X-X which puts the aperture of the plunger tube 10, and therefore the interior of the container 1, in communication with an inner chamber 12 of the housing 6.

The end of the housing 6 facing outwardly of the container has an annular shoulder 13 which clamps a sealing element 14 of elastically deformable material against the inner surface 15 of the cover 7.

This cover 7 has an axial bore 16 and is extended outside the body 1 of the container by a flange 17 to which a temporary sleeve 18 is fixed by an annular region 19 of reduced thickness which constitutes a weak line along which the sleeve 18 is cut from the terminated aerosol bottle or container.

Slidably mounted inside the chamber 12 is a piston 20 which defines, between its outer lateral surface and the inner surface of the chamber 12, a passage 21 which puts the interior of the body 1 of the container in communication with the exterior either in one direction, for example for blowing and filling the container, or in the opposite direction for the purpose of the utilization of the container for dispensing the product containing therein.

The piston 20 is urged elastically toward the sealing element 14 by a coil spring 22 which bears against an annular groove 23 formed in the inner surface of the piston 20 and against the shoulder 24 formed in the end of the chamber 12 adjacent the end portion 9.

In the embodiment shown in FIG. 1, the piston 20 is maintained in a position spaced away from the sealing element 14 so as to permit the passage of the various fluids such as the blowing air, the cooling fluid, the inert gas for scavenging, the filling fluid, and the propelling gas. This is ensured by abutment means, such as a finger portion 25, which is connected to the cover 10 by thin radial tabs 26 which are capable of being cut at the end of the operations for admitting the various fluids in the container.

The finger member 25 is in the form of a cylinder whose end 27 adjacent the interior of the body 1 acts as a support for the piston 20 and ensures that it is maintained in the withdrawn position. The finger member 25 extends through the sealing element 14 in the centre of the latter and is provided with longitudinal grooves 28 which allow communication between the two regions defined on each side of the sealing element 14, that is to say the interior of the valve communicating with the interior of the body 1 and the exterior of the container. The longitudinal grooves 28 of the finger member 25 define therebetween ribs 29 (FIG. 2) which ensure a smooth sliding contact with the surface of the centre aperture 30 of the sealing element 14. Mounted inside a cylindrical portion 32 of the sleeve 18 which is adjacent the flange 17 of the cover 7 of the valve body 2, is a cutter 31 which is adapted to separate the finger member 31 from the cover by cutting the tabs 26 subsequent to the container-filling operations.

The cutter 31 is actuated by any appropriate means, such as a shifting device employing a single or double-acting jack (not shown). The front or leading part of the cutter 31 has a cutting edge 33 and a shoulder 34 which is adapted to abut against the outer surface of the cover 7 of the valve body 2 so that the cutting edge 33 cannot harm the sealing element 14.

The finishing and filling operations for the container shown in FIGS. 1 and 2 are carried out in the following manner.

With the container and its temporary sleeve arranged as shown in FIG. 1, there are carried out the final stages of manufacture of the body of the container and the operations for filling it with active liquid and a propelling gas. The cutter 31 is then shifted in translation in the direction of arrow f, so that its cutting edge 33 cuts the radial tabs 26 of the finger member 25.

As the finger member 25 is released, it is urged outwardly of the valve body 2 by the piston 20 which is itself urged into a position of abutment against the sealing element 14 by the spring 22. In this way, the valve is closed (FIG. 2). The finger member is still maintained on the valve body 2 through the action of its ribs 29 which bear against the centre aperture 30 of the sealing element 14. The cutter 31 is then returned to a withdrawn position and the sleeve 18 is separated from the valve body 2 by cutting by any appropriate means along the weak line 19 provided between the flange 17 of the valve body 2 and the sleeve 18.

The container is thus terminated and conveyed to other stations at which the finger member 25 is removed and replaced by a push-button (not shown). The container may meanwhile undergo any finishing operations: burr or fin removal, marking, decoration, checking etc.

The arrangement just described has a number of advantages over the prior art. Owing to the finger member 25, the piston 20 is already placed in position during all the operations for admitting the various fluids so that these operations are less delicate to carry out and avoid the risk of damaging the sealing element 14.

When the radial tabs 26 have been cut by the cutter 31, the valve closes practically instantaneously. When the radial tabs 26 are cut, the finger member is not discharged and remains connected to the valve body 2. This enables the finger member to be removed at a suitable point of the production line.

Owing to the shoulder 34 provided on the active end of the cutter 31, the travel of the latter is limited to merely that required for cutting the radial tabs 36 and there is no danger of harming the sealing element 14.

Figure 5:
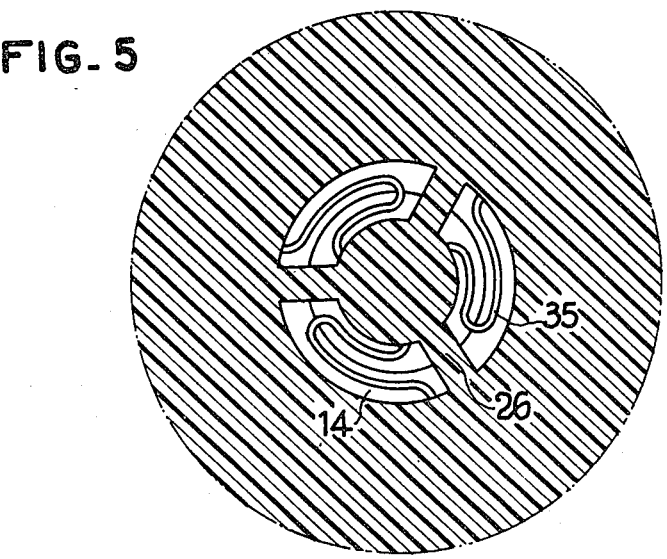
FIG. 5 is a sectional view taken on line 5—5 of FIG. 4.

FIGS. 4, 5 and 6 show a modification of the invention which differs from the embodiment shown in FIGS. 1-3 in that the finger member 25$^a$ has a smaller diameter. It is no longer guided in translation by the surface of the aperture 13 of the sealing element 14 and therefore does not rub against the latter. In this way, there is no need to provide longitudinal grooves, such as 28, and guiding ribs, such as 29, which facilitate the passage of the different fluids.

When the radial tabs 26 are cut and in order to ensure that the finger member 25$^a$ is not discharged in the region of the filling station, the finger member is maintained connected to the cover 7 of the valve body 2 by fine and flexible branches 35 which are cut at a point of the production line where the discharge of the finger member is desired. The length of these branches 35 enable, when the radial tabs 26 are cut by the cutter 31, the finger member 25$^a$ to be urged outwardly of the body of the container, when the piston 20 moves to the closing position, while remaining hooked to the cover 7 of the valve body 2.

Having now described our invention what we claim as new and desire to secure by Letters Patent is:

1. In a valve for assembling with a container and thereby forming a spraying container structure, the valve comprising a housing, a cover which is provided with a temporary sleeve and is combined with said housing to form a valve body, the housing and the cover defining therebetween a chamber and each defining an axial aperture opening into said chamber, the aperture of the housing being for putting the chamber in communication with the interior of the container and the aperture of the cover communicating with the interior of the sleeve, a sealing element mounted in the chamber, a closure member mounted in said chamber to be movable between an inoperative position spaced away from the sealing element and providing for communication between the chamber and the interior of the sleeve through said cover aperture and an operative position in which it is in sealing engagement with the sealing element for sealing off the cover aperture from the chamber, elastically yieldable means interposed between the valve body and the closure member for applying the closure member against the sealing element in said operative position; the improvement comprising abutment means for temporarily maintaining the closure member in said inoperative position and destructible fixing means for temporarily fixing the abutment means to the valve body.

2. A valve as claimed in claim 1, wherein the abutment means comprise an axial finger member and the fixing means comprise at least one series of thin substantially radially extending tabs which are capable of being cut, the sealing element defining a centre throughway aperture through which centre aperture the finger member extends.

3. A valve as claimed in claim 2, wherein the finger member has a diameter substantially equal to the diameter of the centre aperture of the sealing element and the finger member has longitudinal grooves for putting opposite sides of the sealing element in communication with each other, the grooves defining therebetween ribs in sliding contact with the sealing element.

4. A valve as claimed in claim 2, wherein the finger member has a diameter which is less than the diameter of the centre aperture of the sealing element, and has a smooth lateral surface.

5. A valve as claimed in claim 4, wherein the series of thin radial tabs are located at an end of the aperture of the cover remote from the housing, and a series of substantially radially extending branches which are thinner and longer than the tabs interconnect the finger member and the cover and are located at an end of the aperture of the cover adjacent the chamber.

* * * * *